United States Patent [19]

Ennis et al.

[11] 4,035,862

[45] July 19, 1977

[54] IN-OUT AUTOMATIC VEHICLE WASHING APPARATUS

[76] Inventors: George E. Ennis, 765 Christy Road, Sharon, Pa. 16146; George Thomas Ennis, 13955 Tahiti Way, Marina Del Ray, Calif. 90291; John W. Nugent, 72 Broadway Road, Masury, Ohio 44438

[21] Appl. No.: 700,815

[22] Filed: June 29, 1976

[51] Int. Cl.² .......................................... B60S 13/06
[52] U.S. Cl. .............................. 15/53 AB; 15/DIG. 2
[58] Field of Search ............... 15/53 R, 53 A, 53 AB, 15/97 B, DIG. 2

[56] References Cited

U.S. PATENT DOCUMENTS

| | | | |
|---|---|---|---|
| 1,298,096 | 3/1919 | Roberts | 15/53 AB |
| 3,035,293 | 5/1962 | Larson | 15/53 AB |
| 3,720,972 | 3/1973 | Ennis | 15/53 AB |
| 3,783,466 | 1/1974 | Bernardi | 15/53 A |
| 3,822,430 | 7/1974 | Larson | 15/DIG. 2 |

*Primary Examiner*—Edward L. Roberts
*Attorney, Agent, or Firm*—Schuyler, Birch, Swindler, McKie & Beckett

[57] ABSTRACT

A vehicle washing apparatus particularly adapted for use in closed bays comprising a stationary frame carrying a plurality of brushes to wash the vehicle as it moves through the unit in a forward direction and to rinse the vehicle as it backs out of the unit in the reverse direction. The brushes include two opposed warp-around brushes, a top brush, and two opposed ledge brushes. The warp-around brushes and the top brush are movable between an operative vehicle washing position during the forward movement of the vehicle and an inoperative retracted position during the reverse movement of the vehicle. The stationary frame carries detergent and rinse spray arches. A control circuit is provided to automatically control operation of the brushes, the detergent arch and the rinse arch pursuant to the passage of a vehicle through the unit.

12 Claims, 6 Drawing Figures

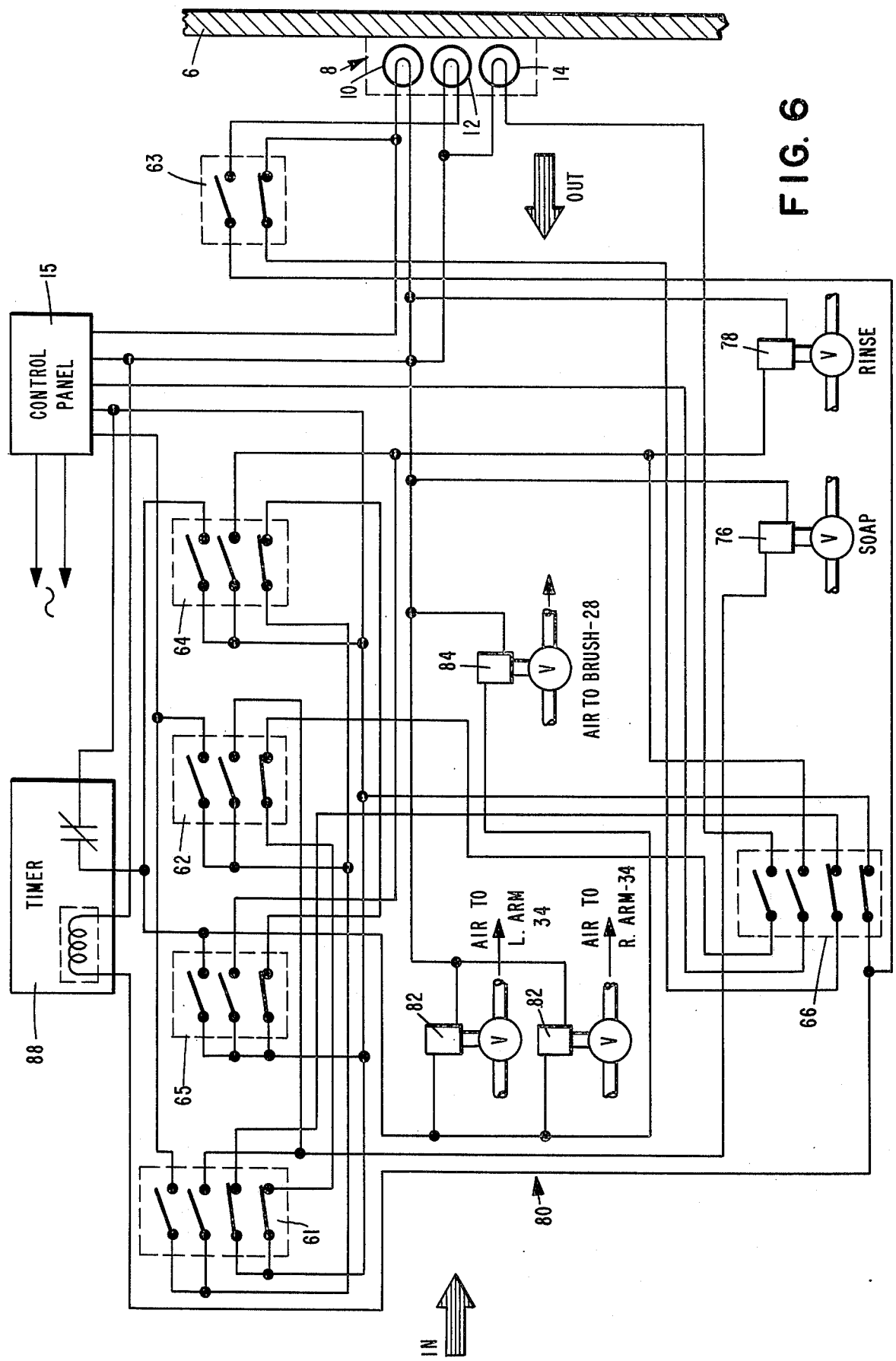

IN-OUT AUTOMATIC VEHICLE WASHING APPARATUS

BACKGROUND OF THE INVENTION

1. Field of the Invention

The present invention relates to an automatic vehicle washing apparatus particularly adapted for washing vehicles in a closed bay or other small space.

2. Description of the Prior Art

Many types of automated vehicle washes, particularly those meant for cars and trucks, have been utilized over the years. However, two types of equipment are primarily in use today. The first type comprises an automatic car wash having a stationary frame carrying brushes, waxers, and the like. The car or other vehicle is driven in one end of this car wash and will exit out the other end in a forward direction after the washing has been completed. An example of this type of car wash can be found in U.S. Pat. Nos. 3,471,883 and 3,755,844 to Ennis. The second type of car wash being used comprises a movable frame carrying the washing brushes and the like. In this type of car wash, the car is parked and the movable frame is adapted to move over the car to wash it. U.S. Pat. Nos. 3,626,536 to Napoli and 3,822,430 to Larson are examples of the second type of car wash.

However, none of the foregoing patents disclose a vehicle washing apparatus which is particularly adapted for use in a bay where a wall closes one end or where space is otherwise at a premium. In the first type of car wash in which the car is driven all the way through the apparatus, the car exits in the same direction in which it came and there must, therefore, be an exit for the car at the end opposite the entrance. Such a car wash cannot be used in a closed bay where no exit exists. Similarly, the second type of car wash, i.e., the movable frame type, is not well adapted for use in a closed bay due to its complexity, tendency for frequent breakdowns, and the need for space in which the movable frame can move.

U.S. Pat. No. 1,298,096 to Roberts discloses an apparatus which can be used to wash a railroad train while the train is moving in one direction and which dries the train as the train moves in the reverse direction. The device of the Roberts patent, however, employs a complex mechanical linkage to control movement of the brushes. Moreover, the apparatus disclosed in Roberts is not adapted for use with vehicles such as cars or trucks nor for use in closed bays or other areas where space is at a premium.

SUMMARY OF THE INVENTION

Accordingly, it is an object of the present invention to overcome the above-noted disadvantages of prior art vehicle washers by providing an automatic vehicle washing apparatus which is particularly adapted for use in a closed or blind end bay or where space is otherwise at a premium.

It is a further object of the present invention to provide an automatic vehicle washing apparatus which is adapted to automatically wash the vehicle as it moves through the apparatus in the forward direction and which will rinse and/or wax the vehicle as it backs out in the reverse direction.

It is an additional object of the present invention to provide an automatic vehicle washing apparatus for use in a closed bay in which the washing brushes and other washing apparatus are carried by a stationary frame.

It is another object of the present invention ot provide an automatic vehicle washing apparatus for use in a closed bay which is durable, simple in construction and which is automatically activated by the passage of the vehicle through it.

Briefly, the present invention accomplishes the foregoing and other objects by providing a vehicle washing apparatus, particularly adapted to wash cars in a closed or blind end bay, having a stationary frame which carries a plurality of washing brushes. The vehicle is washed as it moves forward through the unit and rinsed as it moves in the reverse direction. The washing brushes include two opposed wrap-around brushes, a top brush, and two opposed window and ledge brushes.

The wrap-around brushes and the top brush are moved by suitable means such as air cylinders between an operative car washing position and an inoperative retracted position. Electric motors are provided for rotating all of the brushes in the car wash. The stationary frame also carries a rinse arch and a detergent arch for applying rinse and detergent solutions, respectively, to the car. In addition, the brush units may include detergent applicators.

An automatic control circuit is provided for controlling the operation of the car wash in accordance with the position and direction of movement of the car as the car traverses the car wash. The automatic control circuit incorporates a plurality of switches which are adapted to be activated by the car body. Two of the switches are activated by the car as the car moves through in the forward direction. These switches turn on the detergent flow and start the brush motors. As the car releases the last of these two switches, the brush motors and the detergent flow will be stopped.

A third switch is located in a position adjacent the end wall of the bay and is actuated by the car as the car completes its forward movement through the car wash. The activation of the third switch will cause the brushes to assume their inoperative retracted position and the brushes will be held there, at least initially, by a timer. As the car begins to back out of the car wash, it will activate the remaining two switches which keep the brushes retracted even when the timer drops out and turn on the flow of the finse solution to the rinse arch. When the car leaves the last of these remaining two switches, the rinse solution will be shut off and the brushes will be activated to assume their operative car washing positions in preparation for the next car to be washed.

BRIEF DESCRIPTION OF THE DRAWINGS

The novel features of the invention are set out with particularity in the appended claims, but the invention will be understood more fully and clealy from the following detailed description of a preferred embodiment of the invention as set forth in the accompanying drawings, in which:

FIG. 6 is a schematic diagram of the control circuit for the vehicle washing apparatus of the present invention.

DESCRIPTION OF THE PREFERRED EMBODIMENT

Figure 1:
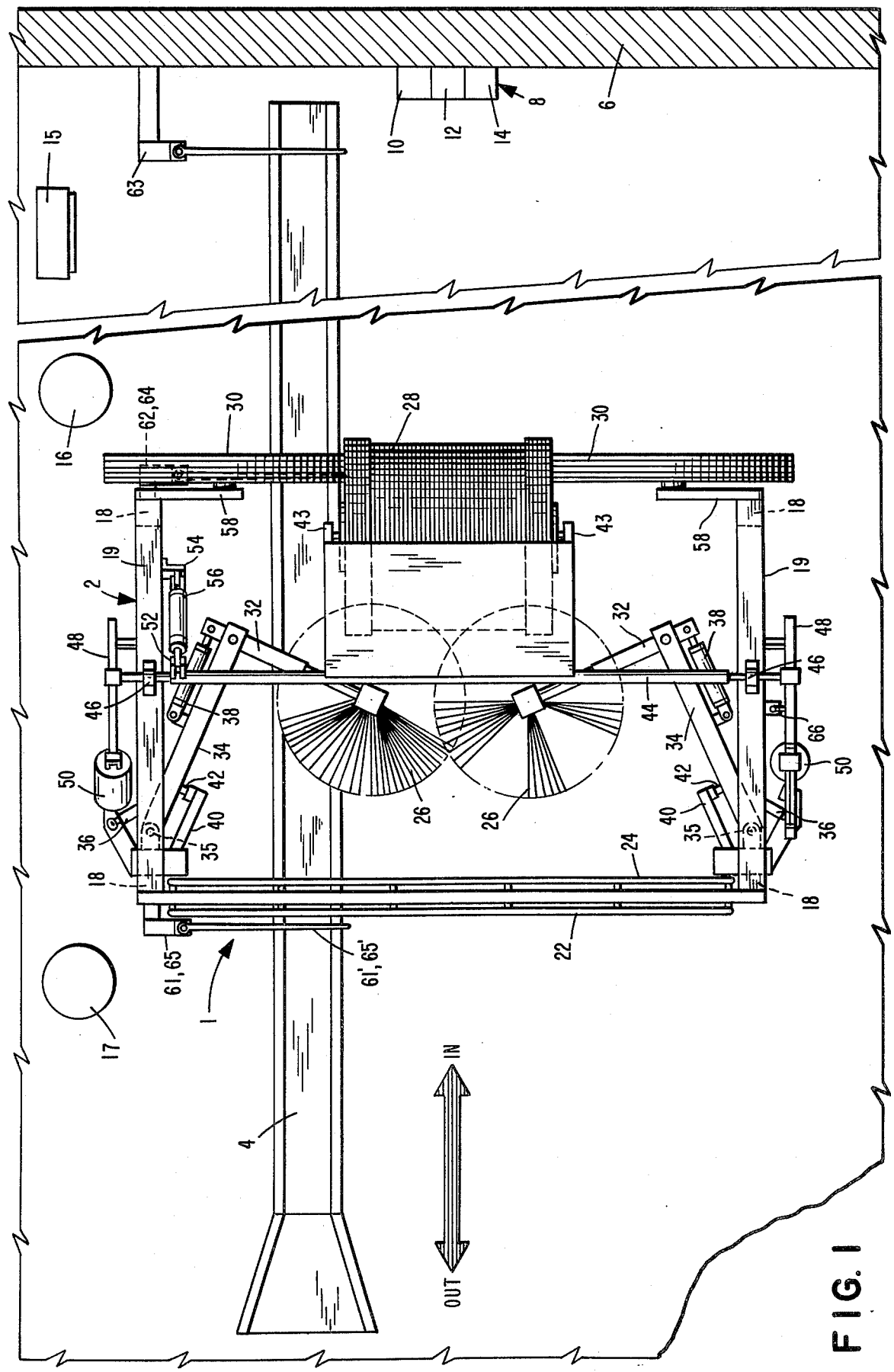
FIG. 1 is a top plan view of the vehicle washing apparatus of the present invention showing the brushes in their operative car washing positions.

Referring to FIGS. 1-4, the in-out automatic vehicle washing apparatus of the present invention, generally indicated at 1, comprises a stationary frame 2 for mounting a five-brush washing unit. Although the washing apparatus 1 may wash any type of vehicle, it is particularly meant for washing cars and will be described hereafter as a car wash. The stationary frame 2 is adapted to straddle the middle portion of a rail 4 which is secured to the floor of the bay in which the car wash 1 is mounted. The rail 4 is shaped to receive the wheels on one side of the car to guide the car through the frame 2 in both a forward and reverse direction as will be explained more fully hereafter.

The car wash 1 is particularly adapted for use in a so-called closed or blind end bay as can be found in many service stations. In such a bay, a wall 6 closes the end of the bay and prevents the car from being driven out of the unit 2 in a forward direction after the washing operation has been completed. Often, this end wall 6 cannot be removed when the back of the service station abuts another building or there is insufficient turning space for the car in back of the station. However, the car wash 1 is not limited exclusively for use in a blind end bay, but may be used in any car washing installation if so desired.

A lighted sign 8 is placed adjacent the end wall 6 of the bay. The sign includes three different colored lights, i.e., a pull forward light 10, a stop light 12, and a back-up light 14, for instructing the driver of the car as to the proper manner in which to proceed through the car wash 1. A control panel 15, a detergent storage container 16 and a rinse-wax storage container 17 may be placed to one side of the car washing apparatus 1.

The stationary frame 2 of the car wash 1 comprises a generally rectangular structure having four vertical uprights 18, one at each corner of the frame 2. Longitudinal cross pieces 19 are connected to the front and rear vertical uprights. A transverse panel 20 is connected between the two front vertical uprights 18 at the top thereof to form the entrance of the stationary frame 2. A rinse arch 22 having a plurality of nozzles for applying the final rinse solution to the car is mounted to the front of the panel 20 and the front vertical uprights 18. Similarly, a detergent spray arch 24 is mounted to the rear of the panel 20 and the front vertical uprights 18 for applying detergent to the car in a manner to be more fully explained hereafter.

The stationary frame 2 mounts five separate washing brushes including two opposed wrap-around brushes 26, a top brush 28 and two opposed window ledge brushes 30. The structure and operation of the wrap-around brushes 26 may be of the type shown in U.S. Pat. No. 3,720,972 issued to George Thomas Ennis, or may be any other type brush which can suitably wash the front and sides of the car.

Figure 2:
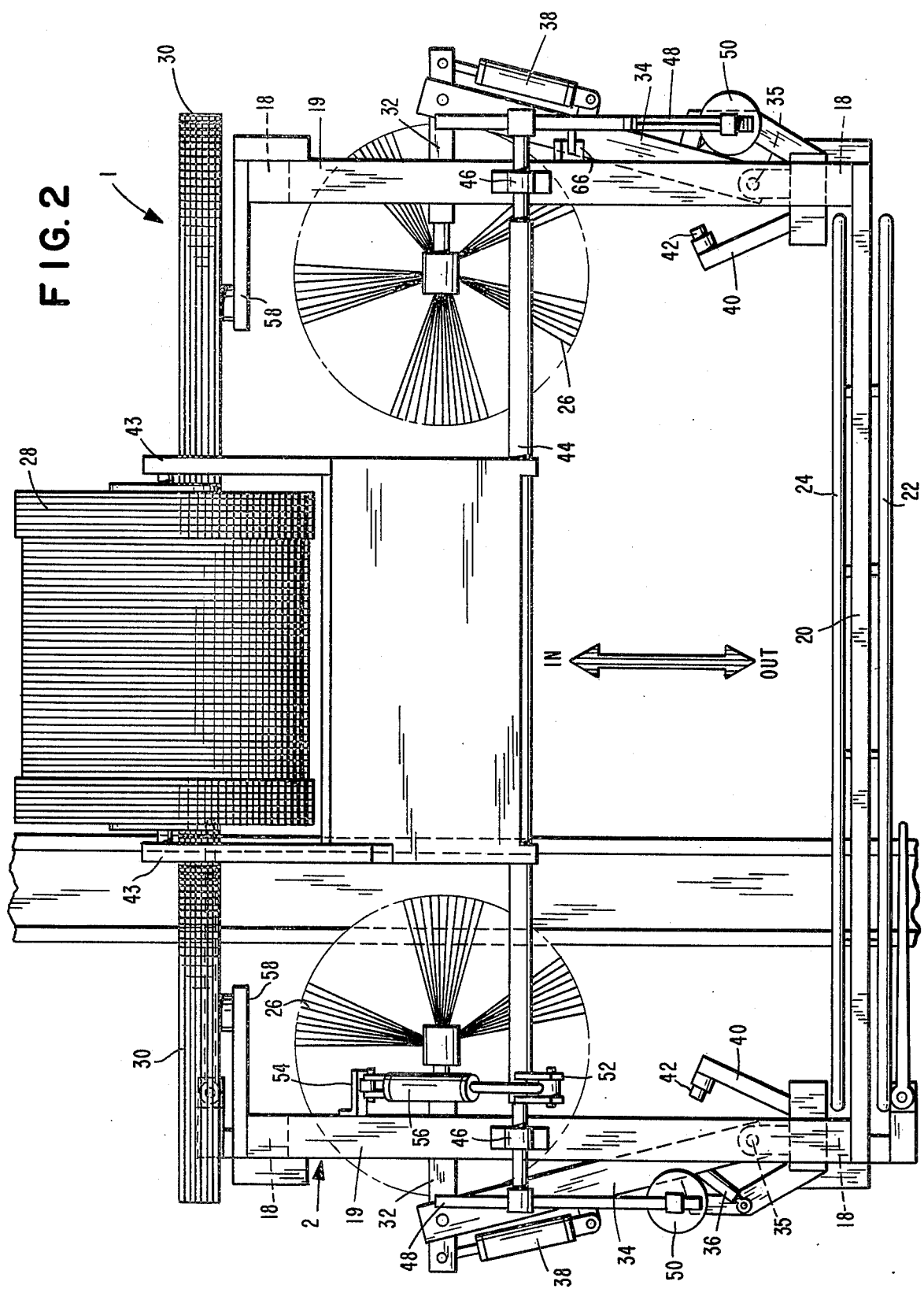
FIG. 2 is a top plan view of the stationary frame of the vehicle washing apparatus showing the brushes in an inoperative retracted position.
Figure 3:
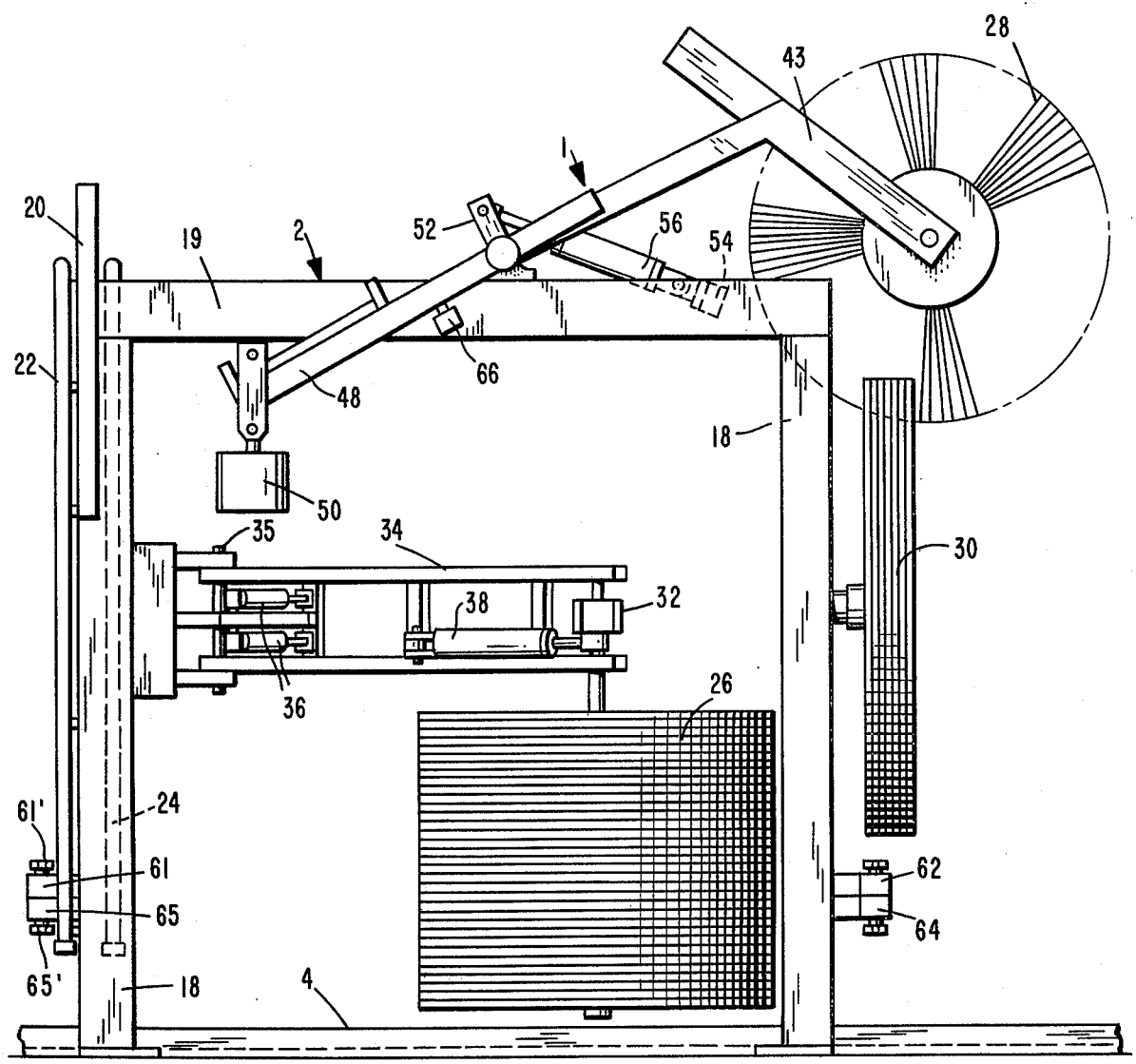
FIG. 3 is an elevational view of the stationary frame of the vehicle washing apparatus of the present invention.
Figure 4:
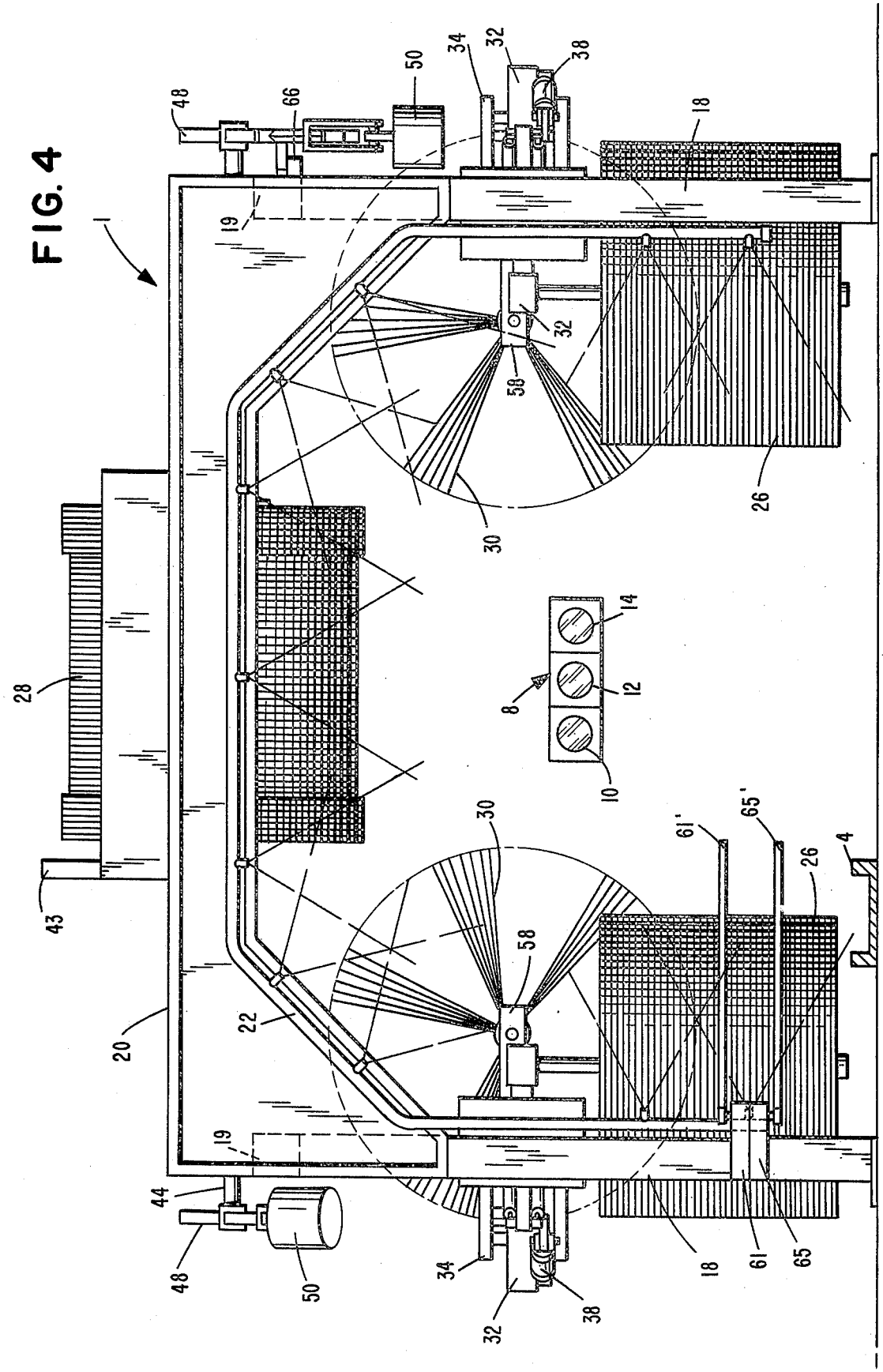
FIG. 4 is a front view of the vehicle washing apparatus of the present invention.

Referring to FIGS. 2-4, each wrap-around brush 26 is carried for rotation around a vetical axis at the outer end of an arm 32. The arm 32 is pivotally connected to an arm 34 which is in turn pivotally connected at 35 to the frame 2 of the car wash 1. Two shock absorbers 36 are pivotally connected at one end to the frame 2 and at the other end to the arm 34 to assist in controlling movement of the arm 34. As shown in FIGS. 2 and 3, an air cylinder 38 is provided between the outer end of arm 32 and arm 34 for controlling pivotal movement of the arm 32 carrying the brush 26 between an operative car washing position and an inoperative retracted position.

A fixed arm 40 is connected at one end to the frame 2 and extends into the path of movement of the arm 34. The other end of the arm 40 carries a rubber stopper 42 for contacting the arm 34 when the arm 34 and the brush 26 are in their operative car washing position. FIG. 1 illustrates the brushes 26 in their operative position awaiting the entry of a car into the car wash 1 while FIG. 2 shows the brushes 26 in an inoperative retracted position.

The top brush 28 is pivotally carried by arms 43 on a transverse shaft 44 which is journalled in bearing blocks 46 mounted on the top of the longitudinal cross pieces 19. As seen in FIG. 2, the shaft 44 extends outwardly beyond the longitudinal cross pieces 19 where it is connected to an arm 48 at each side of the frame 2. Each arm 48 extends a short distance on either side of the shaft 44. The end of the arm 48 which is on the side of the shaft 44 opposite the top brush 28 carries a counterweight 50. This counterweight 50 normally keeps the top brush in a raised retracted position as shown in FIG. 3, or at least serves to reduce the force necessary to lift the top brush 28 into its raised position.

A flange 52 is welded to the top of the shaft 44 at a location a short distance inside of the longitudinal cross piece 19. A bracket 54 may be mounted to the inside of the longitudinal cross piece 19 at a location close to the position of the flange 52. An air cylinder 56 is pivotally connected between the flange 52 and the bracket 54 for moving the top brush 28 between its operative car washing position and its inoperative retracted position shown in FIG. 3. The window ledge brushes 30 are fixedly mounted to each of the rear vertical uprights 16 by means of suitable brackets 58.

All of the brushes 26, 28, and 30 are suitably provided with electric motors (not shown) for rotating the brushes in a washing action. The brushes as depicted in the drawings are shown as they would appear when they are rotating, i.e., in a fully extended position under the influence of centrifugal force. Although a five-brush system has been depicted, it should be understood that any suitable number and type of brushes could be used on the frame 2.

Two microswitches 61 and 65, referred to herein as the first and fifth switches, are mounted to the lower portion of one of the front vertical uprights 18, as shown in FIG. 3 and 4. The microswitches 61 and 65 are actuated respectively by wands 61' and 65' which extend from the switches into the path of the car where they are contacted by the car body. Similarly, two microswitches 62 and 64, referred to herein as the second and fourth switches, are mounted to the lower portion of one of the rear vertical uprights 18 and are wand actuated. Another wand acutuated microswitch 63, referred to as the third switch, is mounted adjacent the end wall 6 of the bay for activation by the front of the car as the car moves out of the stationary frame 2 after the washing operation. A sixth microswitch 66 is mounted to one of the longitudinal cross pieces 19 at a position where it is actuated by one of the arms 48 when the top brush 28 moves into its upper retracted position as shown in FIG. 3. The operation of the switches 61-66 will control the operation of the car wash 1 as explained more fully hereafter.

Figure 5:
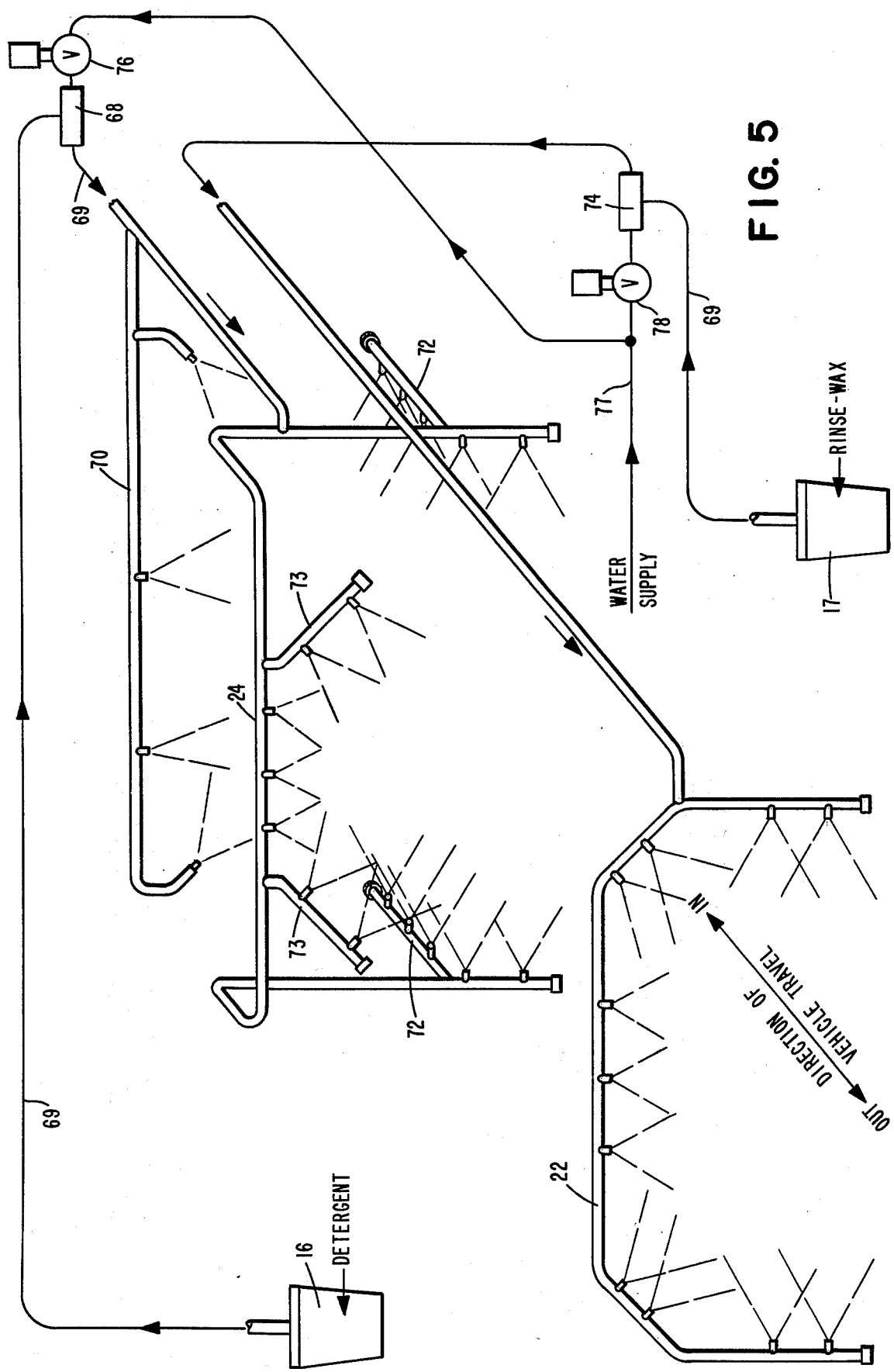
FIG. 5 is a schematic diagram of the detergent and rinse solution plumbing for the vehicle washing apparatus of the present invention.

FIG. 5 illustrates the plumbing arrangement for the rinse arch 22 and the detergent arch 24. A detergent injector 68 with a backflow preventor is connected by means of hosing 69 to the detergent storage container 16 and also to the detergent arch 24 and any extra detergent applicators which might be utilized in conjunction with the arch 24. As shown in FIG. 5, a top brush detergent applicator 70, two side applicators 72 connected to the arch 24 and two ledge and window applicators 73 connected to the arch 24 are also shown in conjunction with the detergent arch 24 for supplying detergent to the car. A rinse injector 74 with a backflow preventor is connected between the rinse and wax storage container 17 and the rinse arch 22. When clear rinse water only is desired to be applied to the car, the rinse and wax storage container 17 is not connected to the rinse injector 74.

A detergent solenoid valve 76 is positioned between the water supply inlet 77 and the detergent injector 68. Similarly, a rinse solenoid valve 78 is positioned between the water supply inlet 77 and the rinse injector 74. Only when the solenoid valves 76 and 78 are suitably actuated so that water will flow through the injectors 68 and 74 will the detergent and rinse solutions be respectively applied to the through the nozzles on the arches and applicators. A suitable pumping system is provided for forcing the detergent and rinse and wax solutions from their containers 16 and 17 to the injectors 68 and 74 respectively.

FIG. 6 discloses the control circuit, generally indicated at 80, for controlling the operation of the automatic car wash 1. The circuit 80 incorporates the switches 61-66 and is connected to the control panel 15 which serves as the source of 110V A.C. power for the control circuit 80. The control circuit 80 also incorporates suitable solenoid air valves 82 which control and activate the air cylinders 38 from a reservoir of compressed air (not shown) to move the wrap-around brushes 26 between their operative car washing position and inoperative retracted position. Similarly, the air cylinder 56 for moving the top brush 28 is controlled by a solenoid air valve 82 which is included in the control circuit 80.

The car wash 1 of the present invention is adapted to wash the car as the car drives into and through the stationary frame 2 and to rinse and wax the car as the car backs out of the frame 2. This method of operation will be described more fully hereafter in conjunction with the automatic control system 80 for controlling the operation of the wash 1. The stationary frame 2 is suitably positioned relative to the end wall 6 of the bay so that a car may completely pass out of the stationary frame 2 before reversing direction. Therefore, the distance between the end wall 6 of the bay and the end of the stationary frame 2 should be equal to at least the length of the largest car to be washed.

In the operation of the car wash 1 of the present invention, the car wash 1 as shown in FIG. 1 is ready to receive a car to be washed. In other words, the wrap-around brushes 26 and the top brush 28 are in their operative car washing positions and the pull forward light 10 is lighted indicating to the driver that he is to pull into the car wash 1. As the car enters the stationary frame 2, the car body activates the first switch 61. Switch 61 will stay activated as long as the wand 61' is held by the body of the car, i.e., for the entire length of the car. The other switches 62-65 stay activated in a similar manner when their respective wands are held by the car.

When the switch 61 is activated, the two normally open contacts shown in the switch 61 close and the two normally closed contacts open. The contacts shown in the other switches 62-65 operate in the manner of those in switch 61. The closing of switch 61 activates the detergent applicator solenoid valve 76 which begins the detergent flow to the detergent arch 24 and the other detergent applicators 70, 72, and 73. It also activates a motor control (not shown) in the control panel 15 which lets 220V 60 cycle three-phase power go from the panel 15, by wiring separate from the circuit 80, to the brush motors (not shown). This starts all of the brushes 26, 28, and 30 rotating and the washing of the car commences. As the car continues through the stationary frame 2, the brushes 26, 28, and 30 will wash the various parts of the car in a normal manner.

Before switch 61 is released by the rear of the car, the second switch 62 is activated by the front of the car. This keeps the detergent applicator valve 76 and the motor control energized so that the detergent flow will continue and the brushes 26, 28, and 30 will continue to rotate even though switch 61 has been released. When switch 62 is released by the rear of the car as the car passes out of the frame 2, the detergent applicator valve 76 is deenergized to stop the detergent flow. The brushes 26, 28, and 30 will also stop operating since the motor control is also deactivated when switch 62 is released.

The third switch 63 is then activated a short time after switch 62 releases when the front of the car reaches the position of switch 63 adjacent the end wall 6 of the bay. When switch 63 is activated, the pull forward light 10 will go off and the stop light 12 will be immediately activated. A timer 88 is also activated by switch 63, the timer having a time delay anywhere from 1 to 10 minutes. The activation of switch 63 and the timer 88 will cause the solenoid air valves 84 and 86 to be activated, thereby swinging the wrap-around brushes 26 to the side and the top brush 28 upwardly. The timer 88 will hold the air valves 84 and 86 activated to keep the brushes in their inoperative retracted positions until the fourth switch 64 is activated to accomplish the same purpose or until the timer 88 deactivates.

When the air valve 86 is activated so that the top brush 28 is lifted upwardly, the sixth switch 66 is activated as the top brush 28 swings into its retracted position. The closing of switch 66 will activate the back-up light 14 to indicate to the driver that he may then back out of the apparatus. If the air valve 86 fails to operate properly so that the top brush 28 fails to swing upwardly, then the switch 66 acts as a safety means and will not allow the back-up light 14 to come on. The driver of the car has up to 10 minutes to back away before the timer 88 deactivates and the brushes 26 and 28 are released to their operative positions. The ledge brushes 30 do not at this time pose an obstacle to the reverse movement of the car as the brush motors are not operating. Thus, the brushes 30 are not extended by cnetrifugal force into the car's path.

As the car begins its reverse movement back through the frame 2, the fourth switch 64 is activated. The closing of switch 64 turns on the rinse solenoid valve 78 causing the flow of rinse water to the arch 22. The closing of the switch 64 will also maintain the air valves 84 and 86 energized to insure that the brushes 26 and 28 are kept up in their inoperative retracted position. As the car moves back in the reverse direction, it will be rinsed. If the storage container 17 is connected to the injector 74, the car will be rinsed and prep waxed.

The fifth switch 65 is activated as the car continues back, but before switch 64 is released. The closing of switch 65 keeps the back-up light 84 on, continues to hold the brushes 26 and 28 in their retracted position and keeps the rinse water going to the arch 22. When switch 65 is released by the car passing out from the front of the frame 2, the solenoid valve 78 will be deactivated stopping the flow of the rinse to the arch 22. The solenoid air valves 84 and 86 will also be deactivated thereby returning the brushes 22, 28, and 30 to their operative car washing position. The back-up light 14 will also be deactivated at that time and the pull forward light 10 will come on. Therefore, as the car leaves the car wash 1 after being rinsed, the car wash 1 is automatically cycled for another wash operation.

Although the present invention has been illustrated in terms of the preferred embodiment, it will be obvious to one of ordinary skill in the art that numerous modifications may be made without departing from the true spirit and scope of the invention and therefore that the scope of the invention is to be limited only by the appended claims.

We claim:

1. An automatic vehicle washing apparatus comprising:
   a. a stationary frame;
   b. a plurality of brushes mounted on said frame,
   c. means for rotating each said brush;
   d. means for moving certain of said brushes between an operative vehicle washing position and an inoperative retracted position;
   e. means for applying detergent to the vehicle;
   f. means for applying rinse to the vehicle; and
   g. electrical control means for controlling the operation of said brush rotating means, said brush moving means, said detergent applying means and said rinse applying means for washing the vehicle as it passes into and through said frame in a forward direction and for rinsing the vehicle as it passes through and out of said frame in a reverse direction.

2. An automatic vehicle washing apparatus as set forth in claim 1 wherein said electrical control means comprises first and second switches, said first and second switches being actuated by the vehicle as the vehicle passes through said frame in a forward direction to cause said brushes to rotate and to apply detergent to the vehicle; a third switch, said third switch being actuated by the front of the vehicle as the vehicle completes its forward movement and passes out of said frame to move certain of said brushes to an inoperative position; and fourth and fifth switches, said fourth and fifth switches being actuated by the vehicle as it passes through said frame in a reverse direction to rinse the vehicle.

3. An automatic vehicle washing apparatus as set forth in claim 2 further including a detergent valve connected to said detergent applying means, said first and second switches adapted when actuated to energize said brush rotating means and said detergent valve whereby the vehicle is washed, said second switch being actuated before said first switch is released by the vehicle.

4. An automatic vehicle washing apparatus as set forth in claim 2 further including a control valve valve connected to each said said brush moving means; a timer connected to said valves and said third switch, said third switch adapted, when actuated, to energize said timer, said timer energizing said control valves to cause said brush moving means to move said brushes into their inoperative retracted position.

5. An automatic vehicle washing apparatus as set forth in claim 4 wherein each said brush moving means comprises an air cylinder, and each said control valve comprises a solenoid air valve.

6. An automatic vehicle washing apparatus as set forth in claim 4 further including a rinse valve connected to said rinse applying means; said fourth and fifth switches adapted when actuated to maintain said control valves energized to hold said brushes in their inoperative retracted position and to energize said rinse valve whereby the car is rinsed, said fifth switch being activated before said fourth switch is released.

7. An automatic vehicle washing apparatus as set forth in claim 2 further including a plurality of indicating lights connected to said control means for controlling movement of the vehicle into and out of said apparatus.

8. An automatic vehicle washing apparatus as set forth in claim 7 wherein said indicating lights include a pull forward light, a stop light and a back-up light, and said electrical control means further including a sixth switch mounted on said frame, said sixth switch being actuated as one of said brushes is moved by said brush moving means to its inoperative retracted position, said sixth switch, when actuated, adapted to energize said back-up light to indicate that reverse movement of the vehicle can begin.

9. An automatic vehicle washing apparatus as set forth in claim 2 wherein said switches are microswitches and said brush rotating means comprise electric motors.

10. An automatic vehicle washing apparatus as set forth in claim 2 wherein said brushes include two opposed wrap-around brushes mounted on said frame and a top brush mounted on said frame.

11. An automatic vehicle washing apparatus as set forth in claim 10 further including two rotatable ledge brushes mounted on said frame.

12. An automatic vehicle washing apparatus particularly adapted for use in a closed end bay having an end wall comprising:
   a. a stationary frame positioned at least one vehicle length in front of the end wall of the bay;
   b. a plurality of brushes mounted on said frame;
   c. a plurality of mounting means pivotally connected to said frame, each said mounting means rotatably supporting one of the said brushes;
   d. motor means for rotating each said brush;
   e. each of said mounting means including means for moving one of said brushes between an operative vehicle washing position and an inoperative retracted position;
   f. a control valve connected to each brush moving means adapted to energize each said brush moving means;
   g. means for applying detergent to the vehicle including a detergent valve;
   h. means for applying rinse to the vehicle including a rinse valve; and, i. an electrical control circuit having first and second switches mounted on said frame actuated by the vehicle as the vehicle passes through said frame in a forward direction to energize said motor means and said detergent means to wash the car, a third switch mounted adjacent the end wall of the bay, a timer connected to said control valves and said third switch, said third switch actuated by the vehicle as the vehicle completes its forward movement to energize said timer, said timer energizing said control valves to cause said brush moving means to move said brushes into their inoperative retracted position, and fourth, and fifth switches mounted on said frame, said fourth and fifth switches actuated by the vehicle as the vehicle passes through said frame in a reverse direction to maintain said control valves energized to hold said brushes in their inoperative retracted position and to energize said rinse valve to activate said rinse applying means to rinse the vehicle.

* * * * *